(12) United States Patent
Iwai et al.

(10) Patent No.: US 8,365,881 B2
(45) Date of Patent: Feb. 5, 2013

(54) BICYCLE DISK BRAKE APPARATUS WITH LAMINATED COMPONENTS

(75) Inventors: Toru Iwai, Kitakatsuragi (JP); Takashi Fujitani, Sakai (JP); Kenji Tsubouchi, Takarazuka (JP)

(73) Assignee: Shimano, Inc., Sakai (JP)

( * ) Notice: Subject to any disclaimer, the term of this patent is extended or adjusted under 35 U.S.C. 154(b) by 1212 days.

(21) Appl. No.: 10/710,355

(22) Filed: Jul. 2, 2004

(65) Prior Publication Data

US 2005/0006186 A1    Jan. 13, 2005

(30) Foreign Application Priority Data

Jul. 11, 2003    (JP) ................................. 2003-273519

(51) Int. Cl.
*F16D 65/12*    (2006.01)
(52) U.S. Cl. .................... 188/218 XL; 188/26
(58) Field of Classification Search ............ 188/218 XL, 188/17, 264 R, 18 A, 18 R, 26, 264 A, 264 D; D12/180
See application file for complete search history.

(56) References Cited

U.S. PATENT DOCUMENTS

| | | | |
|---|---|---|---|
| 3,486,218 A | * | 12/1969 | Buyze ................... 188/218 XL |
| 3,800,392 A | * | 4/1974 | Cook et al. ............. 188/218 XL |
| 4,049,090 A | * | 9/1977 | Buell ....................... 188/251 M |
| 5,626,211 A | | 5/1997 | Gewelber et al. |
| 5,769,185 A | * | 6/1998 | Main et al. ................. 188/18 A |
| 6,343,675 B1 | * | 2/2002 | Seymour ........................ 188/26 |

FOREIGN PATENT DOCUMENTS

| | | |
|---|---|---|
| EP | 1138970 A2 | 10/2001 |
| EP | 1138970 A3 | 10/2001 |
| EP | 1277983 A1 | 1/2003 |
| JP | 56134089 A * | 10/1981 |
| JP | 58-013237 A | 1/1983 |
| JP | 01-153826 A | 6/1989 |
| JP | 2-113134 A | 4/1990 |
| JP | 2679162 B2 | 4/1990 |
| JP | 3016526 U | 7/1995 |
| JP | 2001-234952 A | 8/2001 |
| JP | 2001-280381 A | 10/2001 |
| JP | 2002-121656 A | 4/2002 |

OTHER PUBLICATIONS

Patent Abstracts of Japan, vol. 0134, No. 15 (M-870), published Sep. 18, 1989, for JP 1-153826, published Jun. 16, 1989.

* cited by examiner

*Primary Examiner* — Bradley King
(74) *Attorney, Agent, or Firm* — James A. Deland

(57) ABSTRACT

A bicycle disk brake rotor apparatus comprises a generally circular first rotor member and a generally circular first second rotor member. The first rotor member has a first fixing component structured to mount the first rotor member to a hub mounting member, and the first second rotor member has a first fixing component structured to mount the first second rotor member to the hub mounting member. The first rotor member is attached to a side of the first second rotor member, and the first second rotor member is formed of a material having greater braking wear resistance than the first rotor member.

3 Claims, 7 Drawing Sheets

BICYCLE DISK BRAKE APPARATUS WITH LAMINATED COMPONENTS

BACKGROUND OF THE INVENTION

The present invention is directed to bicycles and, more particularly, to a bicycle disk brake apparatus.

Conventional bicycle disk brake devices comprise a disk rotor that rotates with the bicycle wheel, and calipers with brake pads that frictionally contact the disk rotor to slow or stop the wheel. The disk rotor may be a metal member that comprises a mounting member and a ring-shaped rotor member fixed to the mounting member, wherein the mounting member is structured to be mounted to the bicycle wheel hub. Since bicycles are propelled by human power, reducing the weight of the bicycle components is an important objective of many bicycle manufacturers. This includes reducing the weight of disk brake devices. On the other hand, it is also desirable to resist rotor wear caused by friction with the brake pads while providing proper heat dissipation.

One example of a conventional disk rotor that is lightweight and has good heat dissipation and wear resistance is disclosed in Japanese Unexamined Patent Publication Number 1-153826. That disk rotor comprises a stainless steel rotor braking face member joined by a metal interlayer to a rotor main body consisting of an aluminum alloy. Using aluminum for the rotor main body reduces weight and provides greater heat dissipation compared to rotors fabricated from stainless steel. To construct such rotors, the side of the braking face member that contacts the rotor main body is plated with nickel or the like, and then the braking face member is pressure welded to the rotor main body by holding the braking face member against the rotor main body for several hours at an elevated temperature and pressure. As a result, the rotor main body and braking face member are joined together, with an interlayer of a nickel aluminum metal formed between them. However, such rotors suffer from separation of the braking face member from the rotor main body despite the metal interlayer between them.

SUMMARY OF THE INVENTION

The present invention is directed to various features of a bicycle disk brake rotor apparatus. In one embodiment, a bicycle disk brake rotor apparatus comprises a generally circular first rotor member and a generally circular first second rotor member. The first rotor member has a first fixing component structured to mount the first rotor member to a hub mounting member, and the first second rotor member has a first fixing component structured to mount the first second rotor member to the hub mounting member. The first rotor member is attached to a side of the first second rotor member, and the first second rotor member is formed of a material having greater braking wear resistance than the first rotor member. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
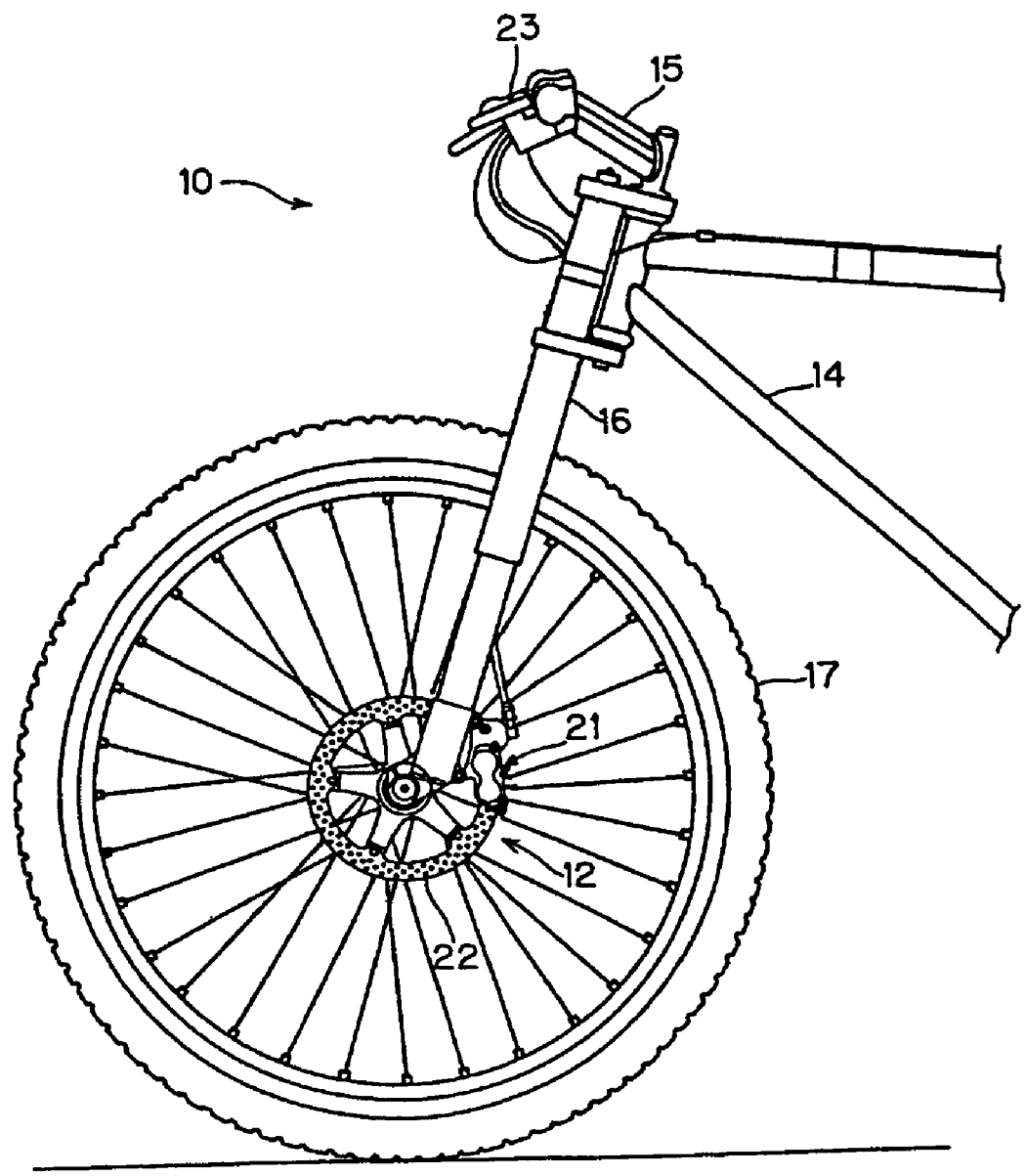
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional one with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17.

Figure 2:
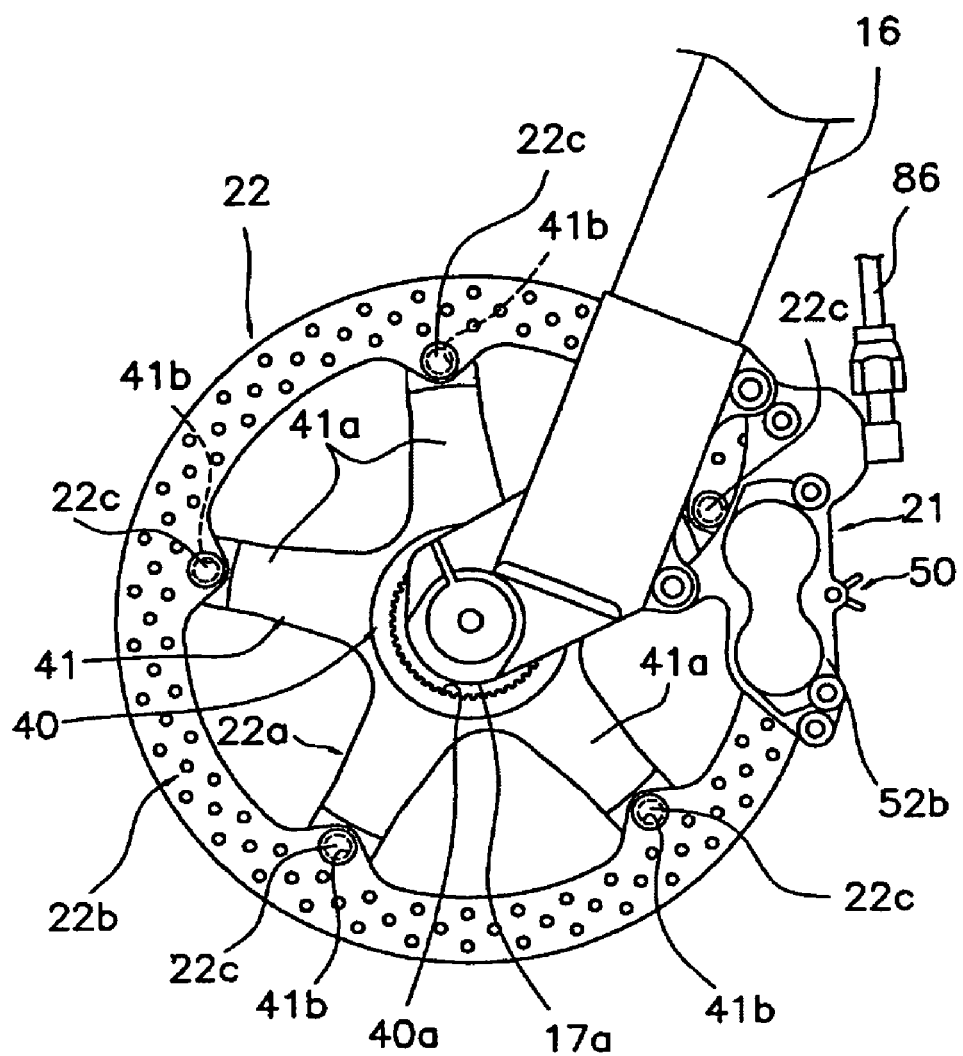
FIG. 2 is a side view of the disk brake apparatus.
Figure 3:
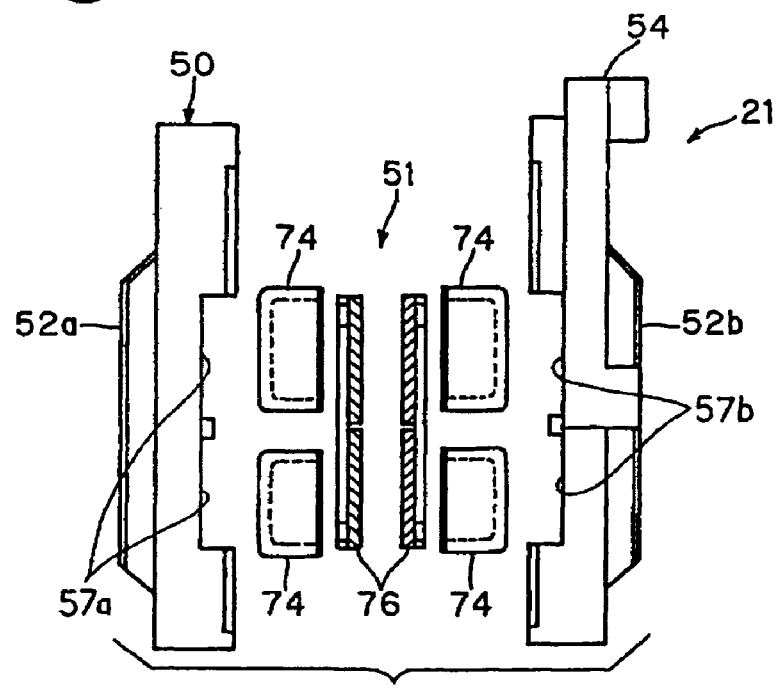
FIG. 3 is an exploded schematic view of the brake caliper assembly.

As shown in FIGS. 2 and 3, brake caliper 21 comprises a housing 50 and a piston unit 51. Housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to second housing member 52b to supply brake oil to both housing members 52a and 52b. Second housing member 52b also has an outwardly extending flange that forms an attachment member 54 for bolting brake caliper 21 to front fork 16.

As shown in FIG. 3, piston unit 51 comprises four pistons 74 and a pair of brake pads 76. Pistons 74 slidably fit into round cylinders 57a and 57b formed in housing members 52a and 52b so as to move between a brake release position and a braking position. Brake pads 76 move integrally with pistons 74. Thus, when pistons 74 move from the brake release position to the braking position, the brake pads 76 also move from the brake release position to the braking position. When in the braking position, brake pads 76 press against and apply a frictional force to brake rotor 22 to thereby decrease or stop rotation of brake rotor 22 and front wheel 17. When in the brake release position, the brake pads 76 are spaced apart from brake rotor 22, thus allowing brake rotor 22 and front wheel 17 to freely rotate.

Figure 4:
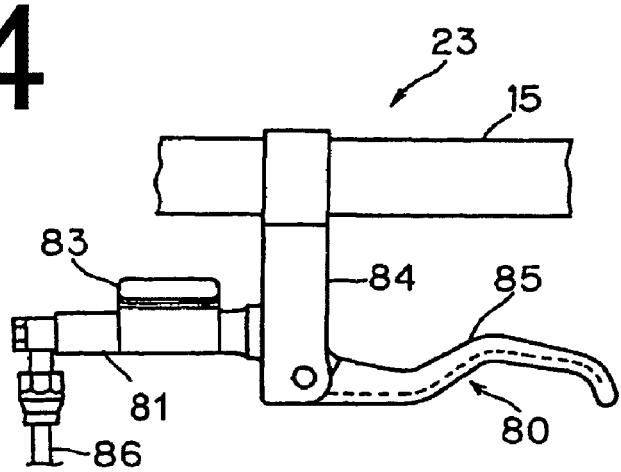
FIG. 4 is a plan view of a particular embodiment of a brake operating device.
Figure 5:
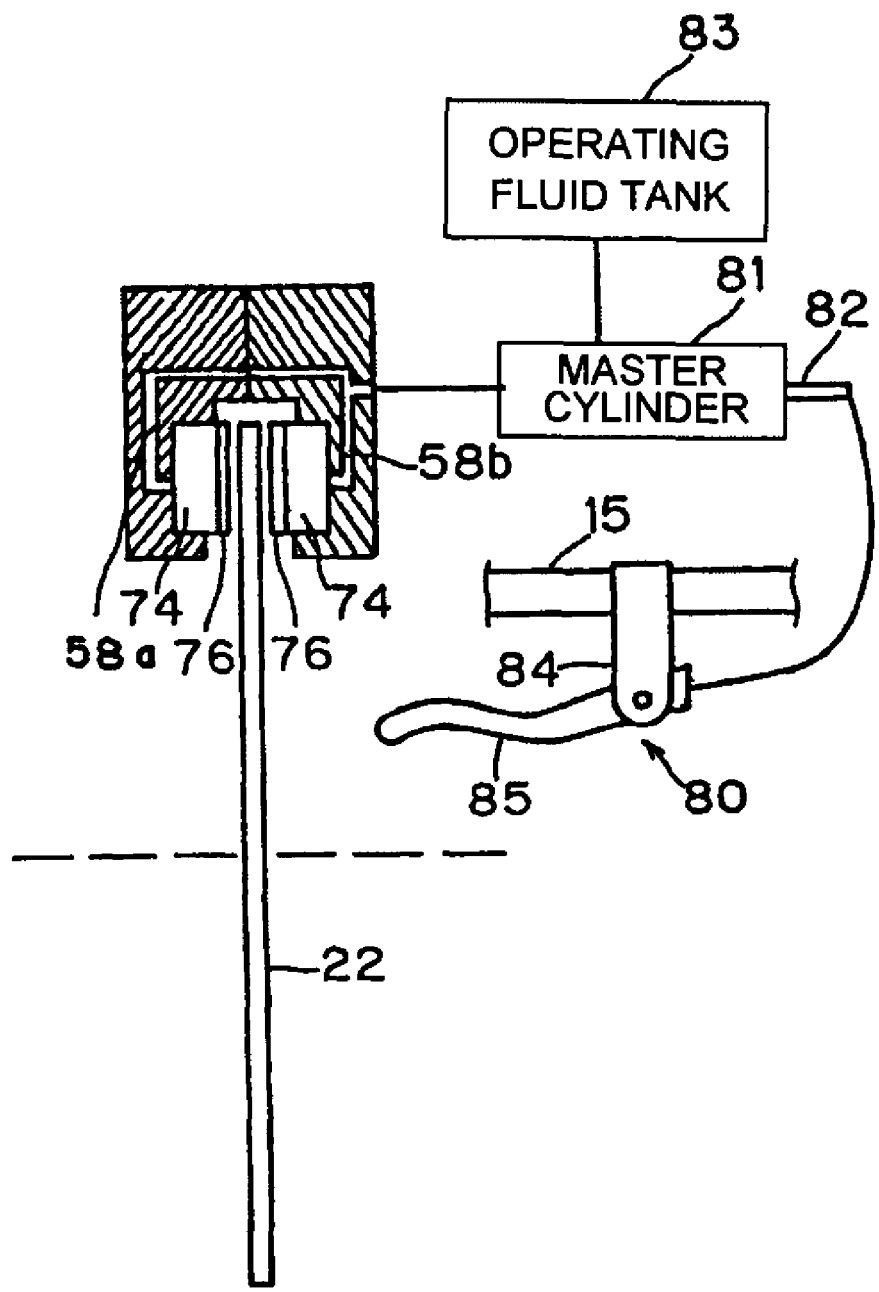
FIG. 5 is a schematic diagram of a particular embodiment of a hydraulic circuit for the disk brake apparatus.

As shown in FIGS. 4 and 5, the brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil moves pistons 74, brake pads 76 contact and apply frictional force to brake rotor 22, and the front wheel 17 is braked.

As shown in FIG. 2, brake rotor 22 comprises a centrally disposed hub mounting member 22a attached to hub 17a, a ring-shaped rotor member 22b for contacting brake pads 76, and a plurality of fixing pins 22c that fix rotor member 22b to hub mounting member 22a. In this embodiment, hub mounting member 22a is constructed of an aluminum alloy and comprises a centrally disposed cylindrical hub attachment component 40 and a rotor attachment component 41. Hub attachment component 41 is attached to hub 17a through a splined component 40a, and rotor attachment component 41 extends radially outwardly from hub attachment component 41. More specifically, rotor attachment component 41 has five arm components 41a extending radially outwardly from hub attachment component 40. A fixing hole 41b for fixing hub attachment component 41 to rotor member 22b is formed at the tip of each arm component 41a.

Figure 7:
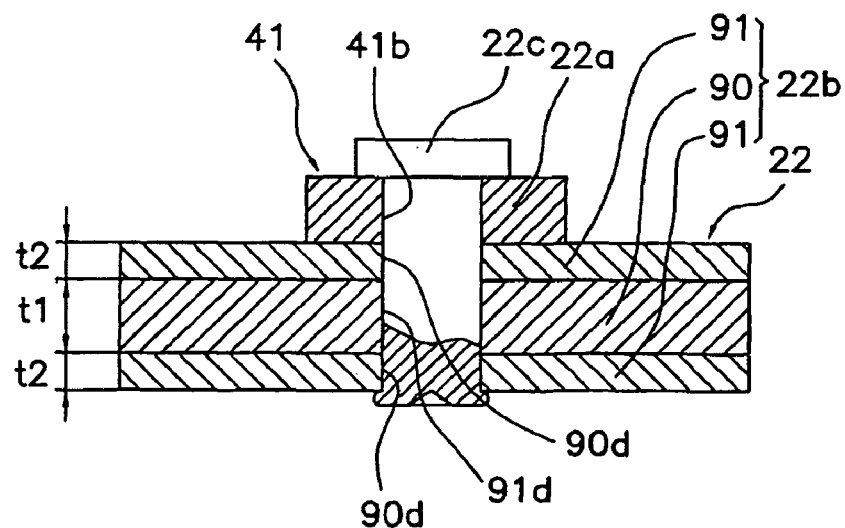
FIG. 7 is a cross sectional view of a portion of the overall brake rotor.

As shown in FIG. 7, rotor member 22b may be a laminated structure comprising a first rotor member 90 sandwiched between a pair of second rotor members 91. First rotor member 90 may be formed from aluminum, which has a relatively high thermal conductivity, whereas second rotor members 91 may be formed from stainless steel, which has higher braking wear resistance than aluminum but less thermal conductivity than aluminum. In this embodiment, the pair of second rotor members 91 may be press welded to opposite sides of first rotor member 90.

Figure 6A:
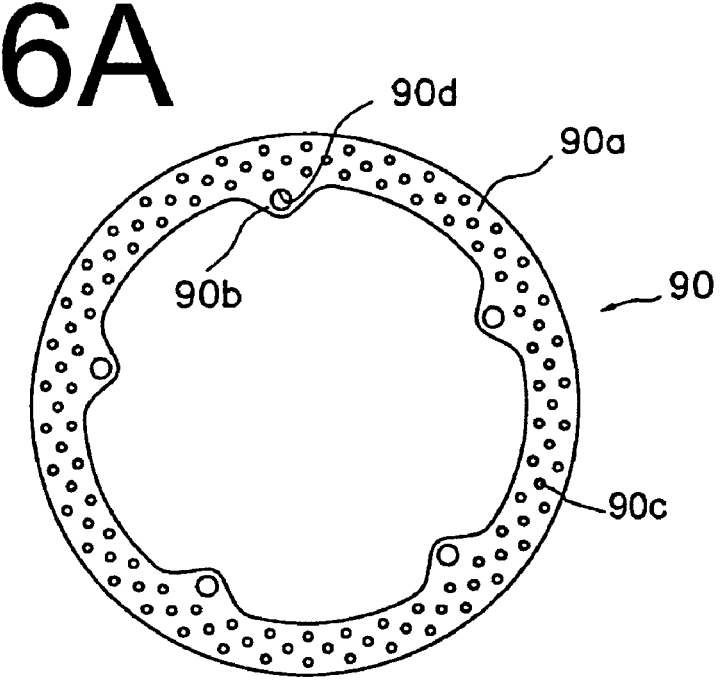
FIG. 6(A) is a plan view of a first rotor member.
Figure 6B:
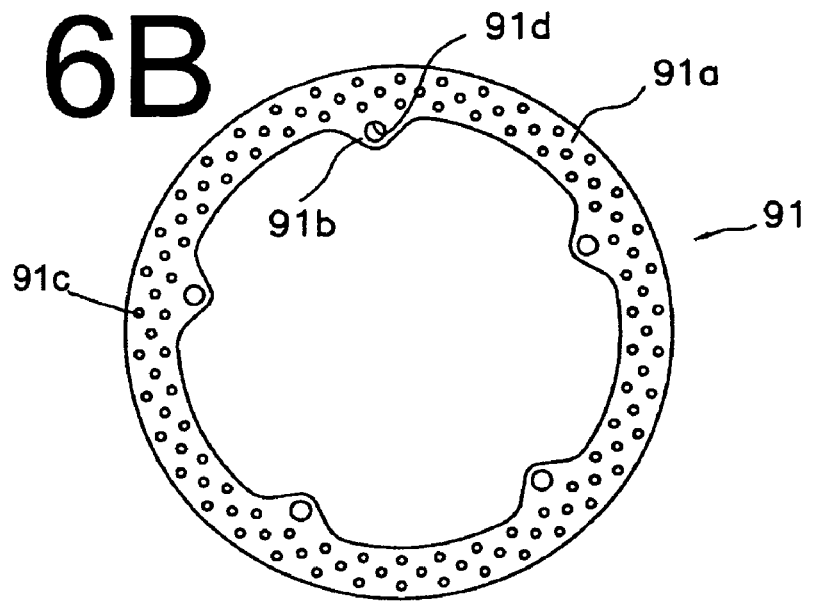
FIG. 6(B) is a plan view of a second rotor member.

As shown in FIGS. 6(A) and 6(B), first rotor member 90 and the pair of second rotor members 91 have the same shape. First rotor member 90 comprises a ring-shaped member 90a with a plurality of circumferentially distributed holes 90c for ventilation and weight reduction. First rotor member 90 also includes a plurality of circumferentially distributed and radially inwardly extending first fixing components 90b, wherein each fixing component 90b has a corresponding fixing hole 90d. Similarly, each second rotor member 91 comprises a ring-shaped member 91a with a plurality of circumferentially distributed holes 91c and a plurality of circumferentially distributed and radially inwardly extending respective first and second fixing components 90b, wherein each first and second fixing component 90b has a corresponding fixing hole 90d. As shown in FIG. 7, each fixing hole 90d is aligned with a corresponding pair of fixing holes 91d for receiving a fixing pin 22c therethrough. Each fixing pin 22c may be formed from aluminum and, as noted above, fixing pins 22c are used to fix rotor member 22b to hub mounting member 22a.

In this embodiment, a thickness t1 of first rotor member 90 is from approximately 0.5 mm to approximately 1.5 mm, and a thickness t2 of second rotor member is from approximately 0.2 mm to approximately 0.8 mm. Setting the thickness of rotor members 90 and 91 within those ranges results in a relatively thick centrally disposed first rotor member 90 that has lighter weight while preserving strength, and the relatively thinner second rotor members 91 also contribute to lighter weight while preserving strength and wear resistance.

Figure 8:
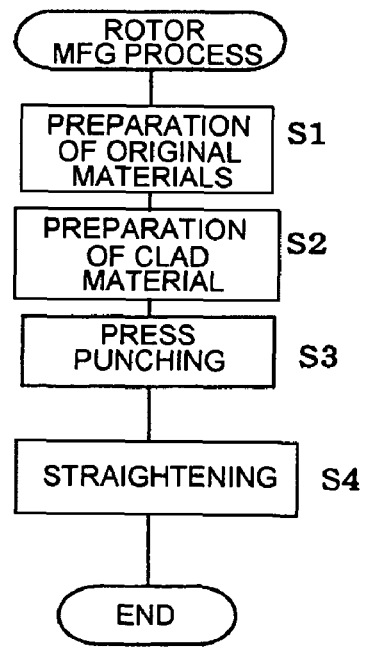
FIG. 8 is a flow chart of a particular embodiment of a process for producing the brake rotor.

FIG. 8 is a flow chart of a particular embodiment of a process for producing the rotor member 22b. In general, rotor member 22b may be produced by laminating an aluminum sheet between a pair of stainless steel sheets and then stamping the laminated structure. More specifically, an aluminum sheet that will form first rotor member 90 and the stainless steel sheets that will form the pair of second rotor members 91 are prepared in a step S1. Then, in Step S2, the aluminum sheet is sandwiched between the pair of stainless steel sheets, and the sheets are press welded by means of hot rolling or forge welding to produce a laminated or cladded structure. In Step S3 the resulting laminated structure is press punched to form the rotor member 22b having the desired shape. Any warping in the resulting rotor material is then corrected to finish the rotor member 22b in a Step S4.

The foregoing process allows a first rotor member 90 to be joined with second rotor members 91 to form an overall rotor member 22b in a simple manner, wherein the individual rotor members may be formed of different materials. The resulting rotor member 22b then may be fixed to hub mounting member 22a, thus simplifying the manufacturing process. Also, the method of fixing rotor member 22b to hub mounting member 22a prevents rotor members 91 from separating from rotor member 90.

Figure 9:
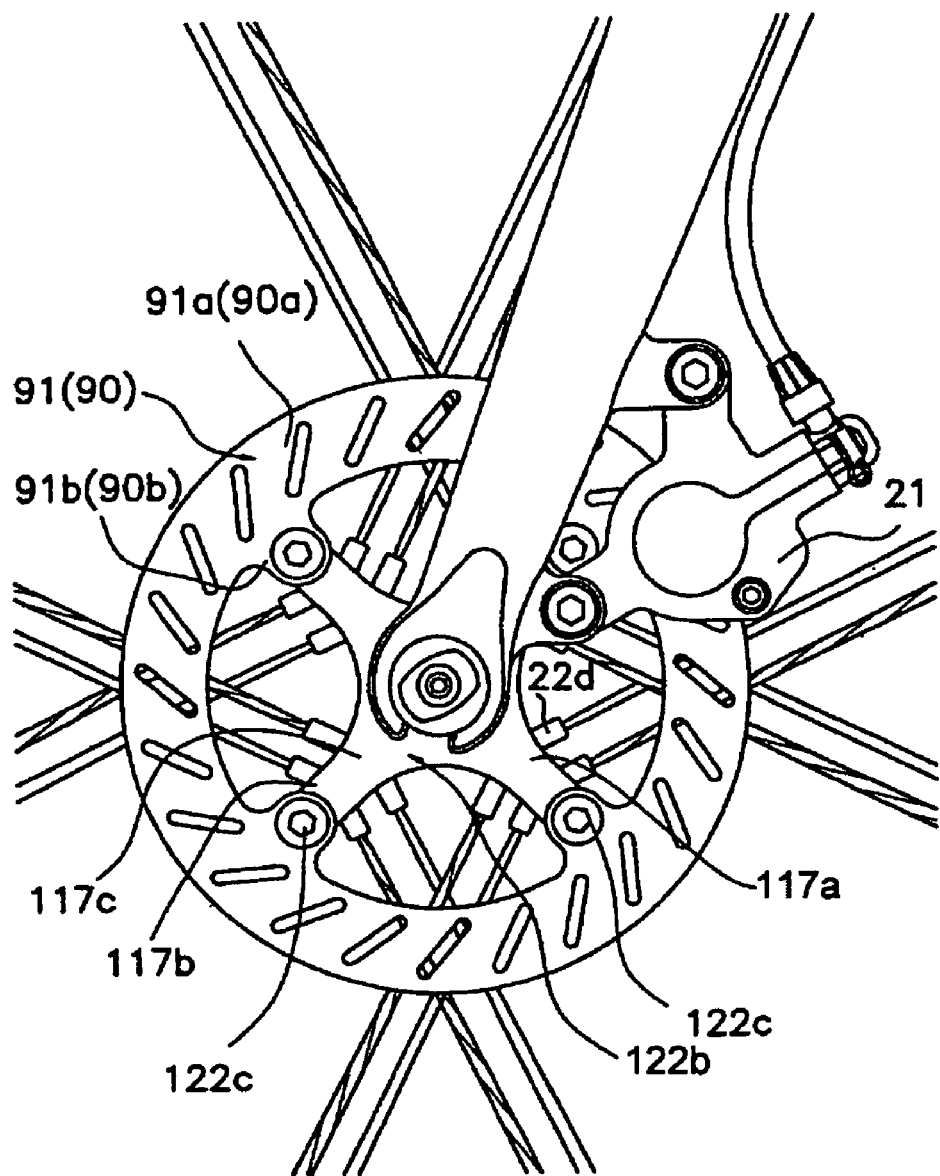
FIG. 9 is a side view of another embodiment of a disk brake apparatus.

While the above is a description of various embodiments of inventive features, further modifications may be employed without departing from the spirit and scope of the present invention. For example, in the above embodiment the rotor member 22b was mounted to the hub 17a through the hub mounting member 22a. However, as shown in FIG. 9, a rotor member 122b may be fixed to a hub 117a without using a separate intermediate mounting member. In that case, a hub mounting member 117b with radially extending arms 117c is formed on hub 117a. The rotor member 122b has first and second ring-shaped rotor members 90 and 91 constructed in the same manner as in the first embodiment, with circumferentially spaced fixing components 90b and 91b protruding radially inwardly. The fixing components 90a and 90b may be fixed to the tips of arms 117c by a hexagonal head bolt 122c.

In the above embodiment, the first rotor member 90 was made of aluminum, and the second rotor members 91 were made of stainless steel, but other materials could be used. Preferably, but not necessarily, the second rotor members 91 should have higher wear resistance than the first rotor member 90, and the first rotor member 90 should be lighter and have better thermal conductivity than the second rotor members 91 in order to ensure lighter weight and better heat dissipation. For example, the first rotor member 90 could be made of a light carbon fiber-reinforced resin or carbon graphite, and the second rotor members 91 may be made of a ceramic. The first rotor member 90 also may be made of a titanium or magnesium alloy.

In the described embodiments, threaded hexagonal bolts and fixing pins were used to fix the rotor member 22b to the other hub components, but other fixing schemes may be used, such as butt deposition, press bonding, or welding.

While the first and second rotor members 90 and 91 were press welded together and then attached as a unit to the hub mounting members 22a or 117a, such press welding is not necessary. Instead, the rotor members may be individually mounted to the hub mounting members 22a or 117a.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle disk brake rotor apparatus comprising:
a hub mounting member;
a generally circular first rotor member;
a generally circular first second rotor member;
a generally circular second second rotor member;
wherein the hub mounting member has greater thermal conductivity than the first second rotor member and the second second rotor member;
wherein the first second rotor member is formed of a material having greater braking wear resistance than the first rotor member;
wherein the second second rotor member is formed of a material having greater braking wear resistance than the first rotor member;
wherein the first rotor member is pressure welded to and disposed between the first second rotor member and the second second rotor member; and
a plurality of first fixing components extending circumferentially around the first rotor member and structured to mount the first rotor member to the hub mounting member;
a plurality of first fixing components extending circumferentially around the first second rotor member and structured to mount the first second rotor member to the hub mounting member; and
a plurality of second fixing components extending circumferentially around the second second rotor member and structured to mount the second second rotor member to the hub mounting member;
wherein each of the plurality of first fixing components on the first rotor member aligns with corresponding ones of the plurality of first fixing components on the first second rotor member and the plurality of second fixing components on the second second rotor member;
wherein at least a majority of the disk brake rotor apparatus between outermost lateral side surfaces of the first rotor member, the first second rotor member and the second second rotor member at correspondingly same radial and circumferential locations thereof is free of voids;
a plurality of fasteners that fasten the hub mounting member to the plurality of first fixing components on the first rotor member, to the plurality of first fixing components on the first second rotor member, and to the plurality of second fixing components on the second second rotor member, the first rotor member, the first second rotor member and the second second rotor member are sandwiched between the plurality of fasteners and the hub mounting member and so that the first second rotor member and the second second rotor member are pressed towards the first rotor member with a compressive force by the plurality of fasteners and the hub mounting member to prevent delamination of the first rotor member, the first second rotor member and the second second rotor member from each other; and
wherein the hub mounting member comprises:
a centrally disposed hub attachment component structured to be mounted to the hub; and
a rotor attachment component extending radially outwardly from the hub attachment component and structured to mount to the plurality of first fixing components on the first rotor member, to the plurality of first fixing components on the first second rotor member, and to the plurality of second fixing components on the second second rotor member;
wherein the first rotor member, the first second rotor member and the second second rotor member each comprises a ring-shaped member, and wherein the plurality of first fixing components on the first rotor member, the plurality of first fixing components on the first second rotor member, and the plurality of second fixing components on the second second rotor member extend radially inwardly from an inner peripheral surface of their respective first rotor member, first second rotor member and second second rotor member.

2. The apparatus according to claim 1 wherein the rotor attachment component comprises a plurality of arm components extending radially outwardly from the hub attachment component, wherein each arm component is fixed to a corresponding first fixing component on the first rotor member, to a corresponding first fixing component on the first second rotor member, and to a corresponding second fixing component on the second second rotor member.

3. The apparatus according to claim 2 wherein at least one of the plurality of fasteners extends through each associated arm component, through each associated first fixing component on the first rotor member, through each associated first fixing component on the first second rotor member, and through each associated second fixing component on the second second rotor member.

* * * * *